US009697420B2

United States Patent
Takahashi

(10) Patent No.: US 9,697,420 B2
(45) Date of Patent: Jul. 4, 2017

(54) INFORMATION PROCESSING SYSTEM, INFORMATION PROCESSING METHOD, AND COMPUTER-READABLE RECORDING MEDIUM

(71) Applicant: NEC Corporation, Minato-ku, Tokyo (JP)

(72) Inventor: Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/765,449

(22) PCT Filed: Jan. 22, 2014

(86) PCT No.: PCT/JP2014/051214
§ 371 (c)(1),
(2) Date: Aug. 3, 2015

(87) PCT Pub. No.: WO2014/125882
PCT Pub. Date: Aug. 21, 2014

(65) Prior Publication Data
US 2015/0363638 A1 Dec. 17, 2015

(30) Foreign Application Priority Data
Feb. 15, 2013 (JP) ................................ 2013-027796

(51) Int. Cl.
*G06K 9/00* (2006.01)
*G06T 7/292* (2017.01)

(52) U.S. Cl.
CPC ..... *G06K 9/00369* (2013.01); *G06K 9/00771* (2013.01); *G06T 7/292* (2017.01);
(Continued)

(58) Field of Classification Search
None
See application file for complete search history.

(56) References Cited

U.S. PATENT DOCUMENTS 9,292,939 B2 * 3/2016 Mineshita ............. G06T 7/2093
2010/0231723 A1 * 9/2010 Nam ................... G06K 9/00771
348/169
(Continued)

FOREIGN PATENT DOCUMENTS

JP 2006-221355 A 8/2006
JP 2007-267294 A 10/2007
(Continued)

OTHER PUBLICATIONS

International Search Report for PCT Application No. PCT/JP2014/051214, mailed on Feb. 25, 2014.
(Continued)

*Primary Examiner* — Delomia L Gilliard

(57) ABSTRACT

To provide an information processing system, an information processing method, and a program, whereby it is possible, using a plurality of video camera videos, to desirably carry out person tracking. An information processing system includes: an appearance time score computation unit which computes a time from when a first mobile body exits a frame from a video of a first video camera to when a second mobile body enters a frame of a video of a second video camera; and a person association unit which, on the basis of an attribute of the first mobile body, a degree of similarity between the first mobile body and the second mobile body, and the time, determines whether the first mobile body and the second mobile body are the same mobile body.

12 Claims, 8 Drawing Sheets

(52) U.S. Cl.
CPC ............... *G06T 2207/10016* (2013.01); *G06T 2207/30196* (2013.01); *G06T 2207/30232* (2013.01); *G06T 2207/30241* (2013.01)

(56) References Cited

U.S. PATENT DOCUMENTS

| | | | |
|---|---|---|---|
| 2012/0019644 A1* | 1/2012 | Hamabashiri | G06T 7/2093 348/77 |
| 2016/0042621 A1* | 2/2016 | Hogg | G08B 13/19604 348/155 |
| 2016/0104357 A1* | 4/2016 | Miyano | G06K 9/00677 348/154 |

FOREIGN PATENT DOCUMENTS

| | | |
|---|---|---|
| JP | 2008-219570 A | 9/2008 |
| JP | 2009-017416 A | 1/2009 |

OTHER PUBLICATIONS

English translation of Written opinion for PCT Application No. PCT/JP2014/051214.

* cited by examiner ical Fiel# INFORMATION PROCESSING SYSTEM, INFORMATION PROCESSING METHOD, AND COMPUTER-READABLE RECORDING MEDIUM This application is a National Stage Entry of PCT/JP2014/051214 filed on Jan. 22, 2014, which claims priority from Japanese Patent Application 2013-027796 filed on Feb. 15, 2013, the contents of all of which are incorporated herein by reference, in their entirety.

TECHNICAL FIELD

Some aspects according to the present invention relate to an information processing system, an information processing method, and a program.

BACKGROUND ART

In recent years, a system that enables the monitoring of a wide range by using video taken by a plurality of cameras has been considered. For example, in PTL 1, a person is tracked by determining whether or not people captured by individual video cameras are the same person based on feature quantities of the people captured by the video cameras and the degree of similarity in the feature quantity with the tracked person.

CITATION LIST

Patent Literature

[PTL 1] Japanese Laid-Open Patent Publication No. 2007-267294

SUMMARY OF INVENTION

Technical Problem

In the technique described in PTL 1, the processing is aborted when a designated predetermined time or more elapses. Due to this, when a tracked person does not appear in a capture range of a video camera within the predetermined time, the tracking of the person cannot be continued. In other words, since the tracking cannot be continued in a case such as when a tracked person has been committing some sort of a criminal act outside the capture range (in a blind area) of the video camera for a long time and other cases, the role of tracking a person cannot be sufficiently performed.

Some aspects of the present invention have been accomplished in view of the above-stated problem, and an object thereof is to provide an information processing system, an information processing method, and a program that are capable of suitably performing the tracking of a person by using video of a plurality of video cameras.

Solution to Problem

An information processing system of the present invention includes:

a unit that calculates a time from when a first mobile body exits a frame of video of a first video camera to when a second mobile body enters a frame of video of a second video camera; and a determination unit that determines whether or not the first mobile body and the second mobile body are the same mobile body based on an attribute of the first mobile body, a degree of similarity between the first mobile body and the second mobile body, and the time.

An information processing method of the present invention includes:

calculating a time from when a first mobile body exits a frame of video of a first video camera to when a second mobile body enters a frame of video of a second video camera; and determining whether or not the first mobile body and the second mobile body are the same mobile body based on an attribute of the first mobile body, a degree of similarity between the first mobile body and the second mobile body, and the time.

A program of the present invention, the program causes a computer to execute:

processing of calculating a time from when a first mobile body exits a frame of video of a first video camera to when a second mobile body enters a frame of video of a second video camera; and processing of determining whether or not the first mobile body and the second mobile body are the same mobile body based on an attribute of the first mobile body, a degree of similarity between the first mobile body and the second mobile body, and the time.

Note that, in the present invention, "unit", "means", "apparatus" or "system" does not simply mean physical implement (hardware) but also includes a case where the function that the "unit", "means", "apparatus" or "system" have is realized by software. Furthermore, it is permissible that the function that one "unit", "means", "apparatus" or "system" has be realized by two or more physical implements or apparatuses or that the functions of two or more "units", "means", "apparatuses" or "systems" be realized by one physical implements or apparatus.

Advantageous Effects of Invention

The present invention allows to provide an information processing system, an information processing method, and a program that are capable of suitably performing the tracking of a person by using video of a plurality of video cameras.

DESCRIPTION OF EMBODIMENTS

Hereinafter, exemplary embodiments of the present invention will be described. In the below description and mention of drawings that will be referred to, the same or similar configurations are given the same or similar reference signs.

1. First Exemplary Embodiment

FIG. 1 to FIG. 7 are diagrams describing a first exemplary embodiment. Hereinafter, with reference to these drawings, the first exemplary embodiment will be described in accordance with the following flow. First, an outline of a system configuration will be illustrated in a section of <1.1>, and an outline of operation will be described in a section of <1.2>. After that, a functional configuration of the system will be described in a section of <1.3>, and a flow of processing will be illustrated in a section of <1.4>, and a concrete example of a hardware configuration capable of realizing the system in a section of <1.5>. Finally, advantageous effects and the like according to the first exemplary embodiment will be described from a section of <1.6> on.

<1.1. System Configuration>

Figure 1:
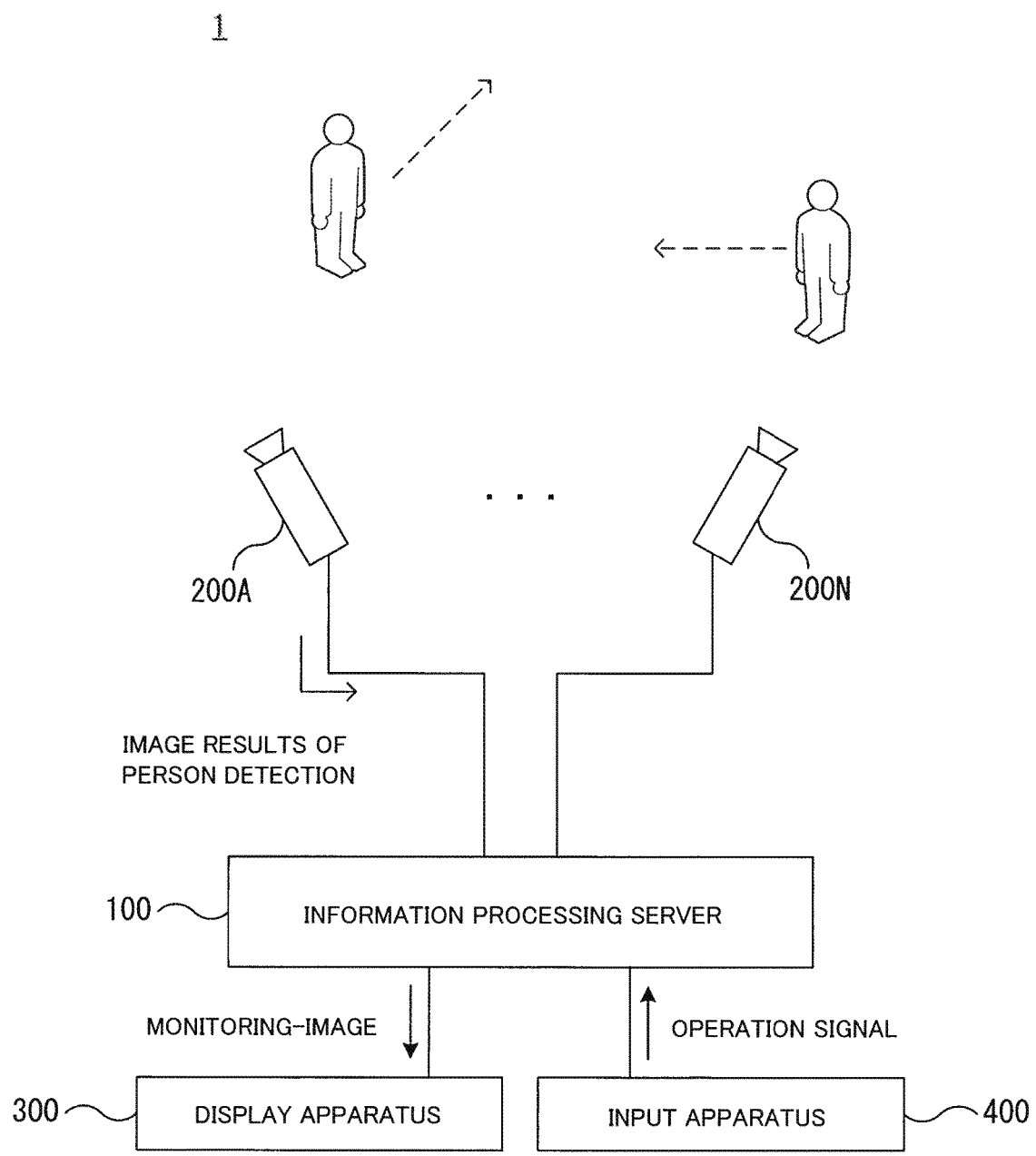
FIG. 1 is a functional block diagram illustrating a general configuration of a monitoring system according to a first exemplary embodiment.

With reference to FIG. 1, a system configuration of a monitoring system 1 that is an information processing system according to the present exemplary embodiment will be described. FIG. 1 is a block diagram illustrating the system configuration of the monitoring system 1.

The monitoring system 1, if roughly divided, is configured by an information processing server 100 and a plurality of video cameras 200 (video cameras 200A to 200N will be collectively termed the video camera 200) that take (capture) an image (moving images).

Hereinafter, description will be made on the assumption that the monitoring system 1 is a system to monitor (track) a person captured by the video camera 200 that are image capturing apparatuses. However, the target of monitoring is not limited to a person. For example, it is conceivable to apply the target of monitoring to various mobile bodies such as motor vehicles, bicycles, or motorcycles.

The video camera 200 captures video (moving image), and determine whether or not there is a person in the video captured, and then output results of person detection that include information regarding such a person, such as the position in the video (that includes a movement locus in the video) or a feature quantity thereof, to the information processing server 100 together with the captured video. Furthermore, the video camera 200 can also perform the tracking of a person within video (within the viewing angle) by comparing captured video between frames.

Note that, processing, such as detection of a person, extraction of a feature quantity thereof, or the tracking of a person within the camera (image), may also be performed not necessarily on the video camera 200 but, for example, on the information processing server 100 or another information processing apparatus that is not depicted in the diagrams.

The information processing server 100 determines whether or not a person captured by the individual video cameras 200 is the same person by analyzing the video captured by the video camera 200. By repeating this operation, the tracking of individual people is performed.

In the processing to determine whether or not a person is the same person, the information processing server 100 identifies the attribute of a person captured, and then determines the identity of the person based on the attribute, the time from the exit from a frame of an image of the video camera 200 to the entrance into a frame of an image of the next video camera 200, and the degree of similarity. Herein, the attribute of a person refers to an attribute that gives variation to the moving speed (i.e., that gives variation to the moving time); for example, a gait characteristic (rove, stagger, or the like), having a belonging (carrying a stick, luggage, or the like), a visitor (unfamiliar with the place), a line-of-sight characteristic (restlessly looking around, repeatedly glancing at a monitoring camera, or the like), a suspicious person (registered in a black list, having a history of past moving times deviated greatly from an average, acting while avoiding other people, or the like), and the like can be cited. Details of the determination method for the sameness will be described later.

As for the video processed at the information processing server 100, it is conceivable that not only real-time video captured by the video camera 200 but also video captured by the video camera 200 and then stored in a storage apparatus (for example, a HDD (Hard Disk Drive), a VCR (Video Cassette Recorder, or the like) is handled as target on which to perform tracking (analysis).

Furthermore, it is also conceivable that the videotored in the storage apparatus is reproduced in the reverse order (reversely reproduced) to perform tracking. Usually, when a certain person takes a suspicious action, it is necessary to investigate in what route the person has moved and what actions the person has taken prior to that action; therefore enabling the tracking by such reverse reproduction is extremely useful.

In the monitoring of a person (the tracking of a person) by the information processing server 100, the information processing server 100 outputs various display images, such as an image for monitoring, to a display apparatus 300 and accepts from an input apparatus 400 operation signals related to various operation inputs related to the monitoring of a person. More concretely, for example, in a monitoring image displayed in the display apparatus 300, a plurality of images input from the video camera 200 are displayed, so that a user who is a monitor can grasp where a person that is a target of monitoring is at that time.

The display apparatus 300 is a display that displays images, for example, in a liquid crystal, an organic EL (Electro Luminescence), or the like. The display apparatus 300 displays the monitoring image output from the information processing server 100.

The input apparatus 40 is an apparatus for a user (monitor) to input various pieces of information. For example, a keyboard, various pointing devices, such as a mouse, a touch pad and a touch panel, and the like correspond to the input apparatus 400. Processing, such as registration of a monitoring-target person, is performed based on the user's operation on the input apparatus 400.

Note that, the configurations of the information processing server 100, the display apparatus 300, and the input apparatus 400 can be changed in various manners. For example, it is conceivable to realize the display apparatus 300 and the input apparatus 400 as one client. Alternatively, the functions of the information processing server 100, the display apparatus 300, and the input apparatus 400 may be realized by three or more information processing apparatuses. Furthermore, in case that the display apparatus 300 and the input apparatus 400 are realized as one client, it is permissible to provide the client with a part of the functions of the information processing server 100 according to the first exemplary embodiment.

<1.2. Description of Operations>
<1.2.1. Method of Controlling Integration Ratio Between Appearance Time Score and Characteristic Quantity>

Figure 2:
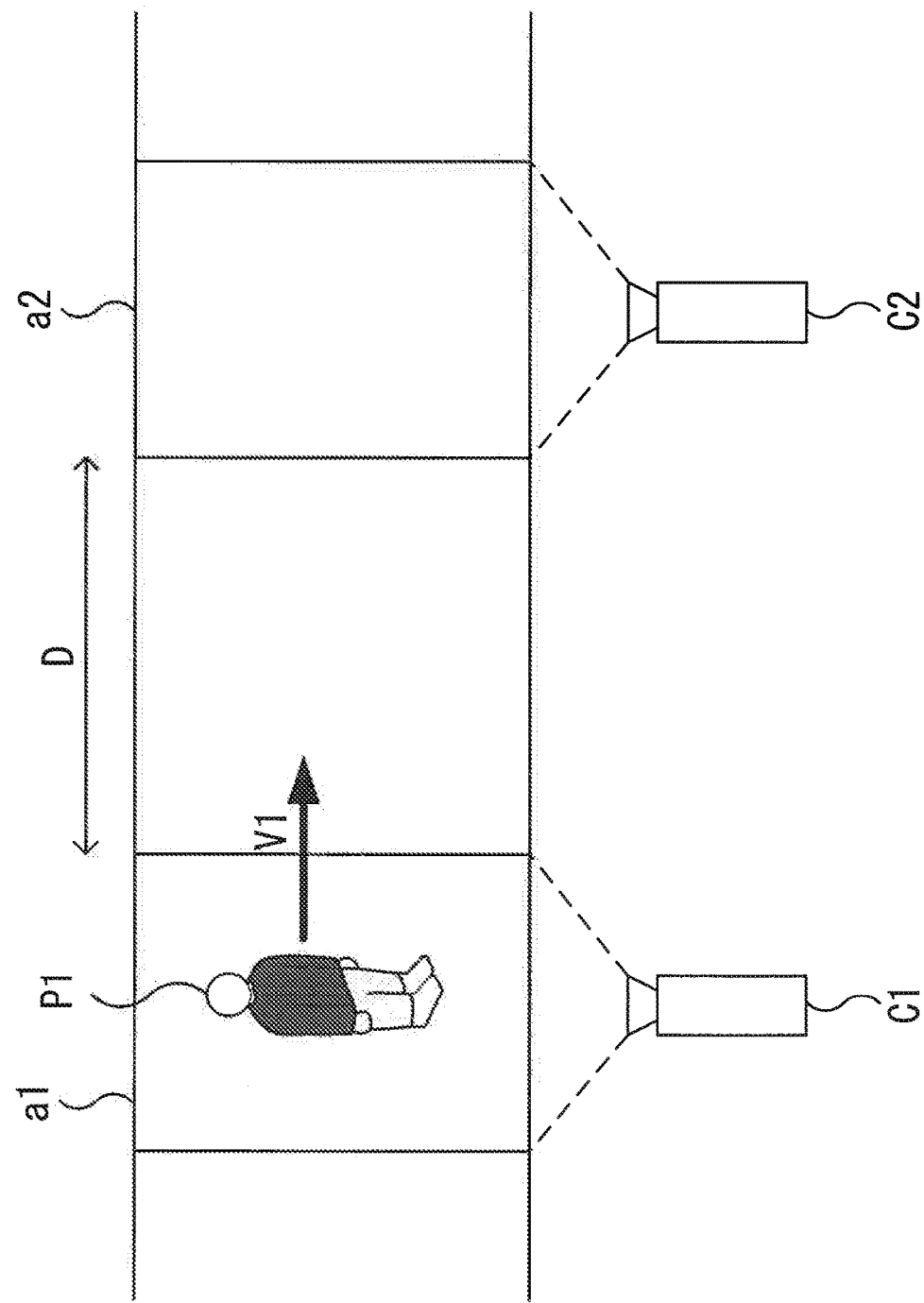
FIG. 2 is a diagram describing a person tracking method in the monitoring system illustrated in FIG. 1.
Figure 3:
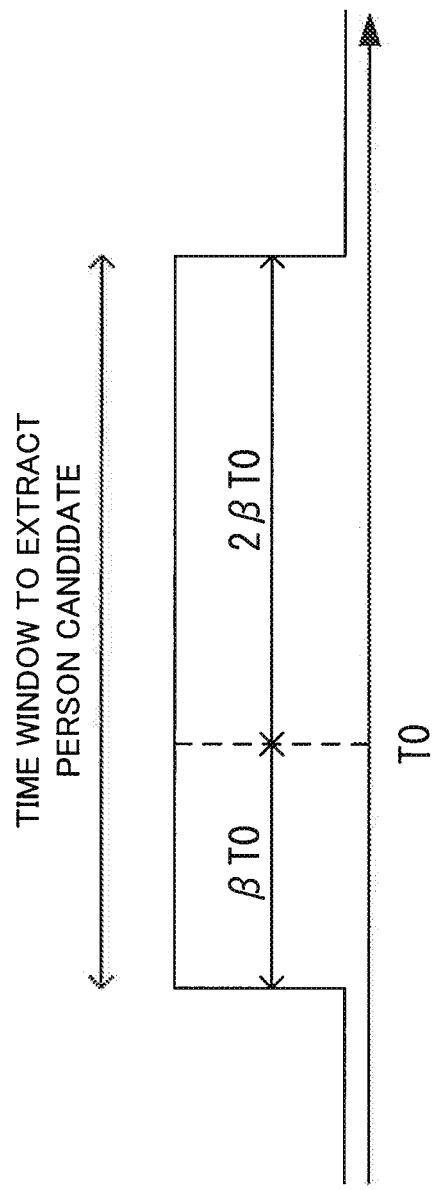
FIG. 3 is a diagram describing a concrete example of a time window to extract a person who is a target of association.

First, with reference to FIG. 2, a tracking method for a person according to the first exemplary embodiment will be described. In FIG. 2, it is assumed that a video camera C1 is capturing video of a capturing range a1 and a video camera C2 is capturing video of a capturing range a2, and that a person P1, an target of tracking, who is in the capturing range a1 is moving at a moving speed V1 in a direction to the capturing range a2.

Note that, although in the example of FIG. 2, a route from the capturing range a1 to the capturing range a2 does not have a branch or the like, the route may be branched, or a point to which the person P1 can move from the capturing range a1 may exist outside the capturing range a2.

In such a case, if speed of the person P1 and distance D between the capturing range a1 and the capturing range a2 are known, the time from when the person P1 exits a frame of an image of the camera C1 to when the person P1 reaches the capturing range a2 can be estimated to be approximately D/V1. Since the distance between the capturing range a1 and the capturing range a2 is known beforehand at the time of setting the video cameras C1 and C2, it suffices that the distance is readily registered in a database (that corresponds to inter-camera information 451 described later). The moving speed V1 of the person P1 can be specifically determined by analyzing the video of the video camera C1.

In other words, a time score when the person P1 having exited the frame of the video of the video camera C1 enters a frame of the video of the video camera C2 (herein, referred to as appearance time score) is highest in the vicinity of D/V1 following the time at which the person P1 has exited a frame of video of the video camera C1, and becomes lower as it is farther away from that time. This appearance time score can be rephrased to be a score to determine whether or not a person who has newly entered the frame of the video of the video camera C2 is the same person as the person P1 who has exited the frame of the video of the video camera C1.

Herein, in a technique of determining whether or not a person who has newly entered the frame of the video of the video camera C2 and the person P1 who has exited the frame of the video of the video camera C1 are the same person by utilizing the appearance time score based on the moving speed V1, it is on the premise that the moving speed of the person P1 going from the capturing range a1 to the capturing range a2 is substantially constant with the moving speed V1 of the person P1 in the video of the video camera C1. However, the moving speed of a person is not necessarily constant. According to the attributes of individual people, there are cases where the moving speed is assumed to be substantially constant, and there are some other cases where the variation in the moving speed is great. As attributes for increased variation in the moving speed, for example, a case where a person has a gait characteristic such as roving or staggering, a case where a person is carrying a belonging such as a stick or luggage, a case where a person is a visitor vising the place for the first time and has a line-of-sight characteristic such as restlessly looking around or repeatedly glancing at a camera, a case where a person can be assumed to be a suspicious person (e.g., the person is a person registered in a black list, a moving time of the person in the past is greatly deviated from the average, the person is avoiding other people, and the like), and the like are conceivable.

When variation is great in this manner, it is difficult to determine whether a person who has exited the frame of the video of the video camera C1 and a person who has entered the frame of the video of the video camera C2 are the same person. Therefore, in the information processing server 100 according to the first exemplary embodiment, after the feature quantity of a person imaged in the video camera C1 and the feature quantity of a person imaged in the video camera C2 are compared, the degree of similarity there between is determined. The higher this degree of similarity is, the higher the possibility of the two people being the same person is. It is designed to determine whether a person who has exited the frame of the video of the video camera C1 and a person who has entered the frame of the video of the video camera C2 are the same person based on the degree of similarity and the appearance time score. Note that, it is conceivable to determine whether or not such two people are the same person based on only the degree of similarity in the feature quantity. However, if it is determined in that manner, there arises a problem that it becomes difficult to determine whether such two people are the same person, for example, when there are many people wearing a uniform, that is, when there appear many people having similar feature quantities. Therefore, in the first exemplary embodiment, the determination as to whether such two people are the same person is performed by using the appearance time score as well.

Concretely, a score for determining whether or not such two people are the same person can be calculated by the following mathematical expression.

$$\text{Score} = \alpha \times (\text{appearance time score}) + (1-\alpha) \times (\text{feature quantity similarity degree}) \quad [\text{Math. 1}]$$

Where, $\alpha$ is a parameter concerning which one of the appearance time score and the feature quantity is more emphasized to determine whether or not such two people are the same person. In the first exemplary embodiment, this parameter $\alpha$ is designed based on the attribute of the person P1. More concretely, it is conceivable that when the person P1 is a person having an attribute such that the moving speed is likely to vary, for example, the parameter $\alpha$ is set in $\alpha=0.2$ in order to increase the relative weight of the degree of similarity in the feature quantity, and when the attribute of the person P1 is not the attribute such that the moving speed is likely to vary, the parameter $\alpha$ is set in $\alpha=0.5$, in order that the relative weights of the appearance time score and the degree of similarity in the feature quantity are equivalent to each other.

<1.2.2. Method of Changing the Time Window Width to Extract Person Candidate>

Other than this, it is conceivable to set a time window to determine the sameness of people. For example, assuming that the time at which it is predicted that the person P1 will reach the video of the video camera C2 based on the moving speed V1 of the person P1 is T0 (incidentally, T0 corresponds to after the elapse of D/V1 after the person P1 exits the frame of the video of the video camera C1), time T to determine whether or not a person is the same person as the person P1 can be set as follows. For example, the following description will be made assuming $\gamma=2\beta$ (refer to FIG. 3).

$$(1-\beta)T0 < T < (1+\gamma)T0 \quad [\text{Math. 2}]$$

That is, only a person who appears in the video of the video camera C2 in this time width is a target to determine (target of extraction) regarding the sameness as the person who has exited the frame of the video of the video camera C1. Note that the time $(2\beta \times T0)$ from a predicted appearance time T0 to $(1+2\beta) \times T0$, which is the upper limit of the time window that is target of extraction, is longer than the time (β×T0) from the predicted appearance time T0 to (1−β)×T0, which is the lower limit of the time window, because the moving speed of a human being is considered to have a broader width on the slowing-down side than on the quickening side.

In the foregoing expression, β is a parameter to set the width of the time window that is target to determine concerning the same person. This width of the time window is determined by the magnitude of variation in the appearance time of a person. Hence, it suffices that β is set large for a person who has the attribute such that the variation in the moving time is considered to be large, and that β is set smaller than that for a person who has the attribute such that the variation in the moving time is considered to be small.

Note that, with regard to the determination as to the sameness between a person who appeared in the video camera C2 in the time window width and a person who has exited the frame of the video camera C1, the calculation may be carried out based mainly on the degree of similarity in the feature quantity or the calculation may be carried out by combining the appearance time score and the degree of similarity in the feature quantity as described in the section of <1.2.1>. A technique of calculation by combining the appearance time score and the degree of similarity in the feature quantity will be mainly described below.

<1.3. Function Configuration of System>

Figure 4:
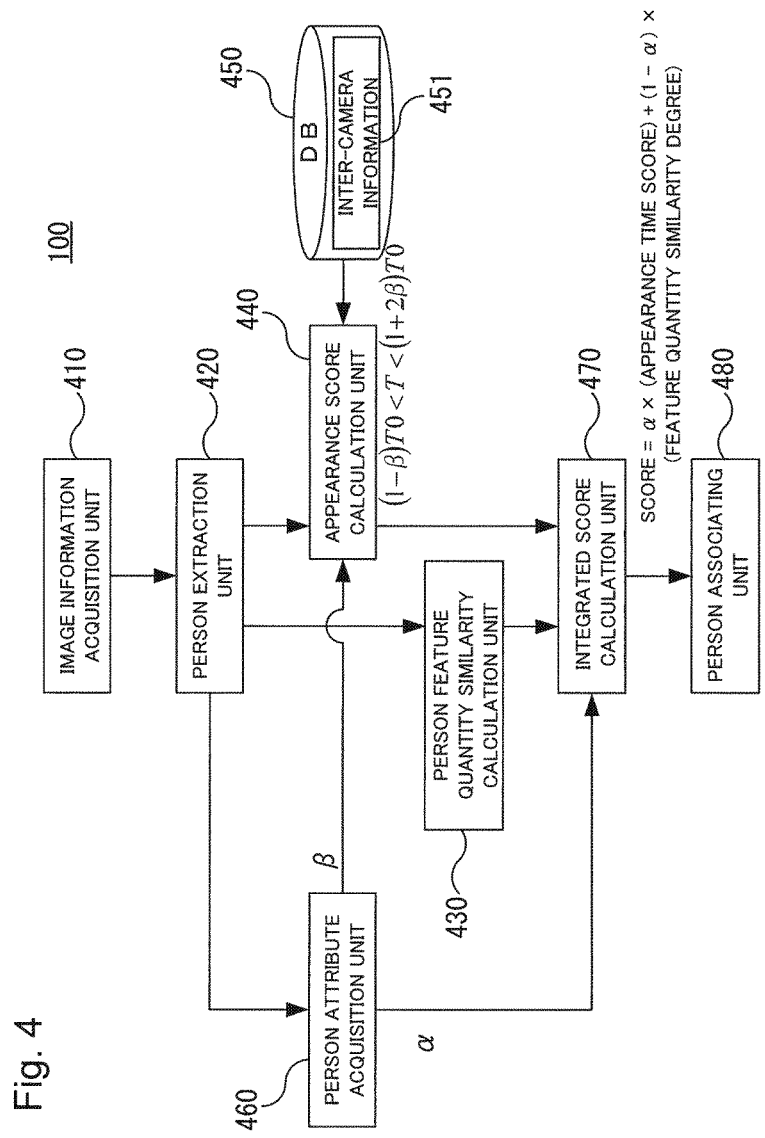
FIG. 4 is a functional block diagram illustrating a general configuration of an information processing server illustrated in FIG. 1.

Next, with reference to FIG. 4, a functional configuration of the information processing server 100 according to the first exemplary embodiment will be descried. FIG. 4 is a functional block diagram illustrating a functional configuration of the information processing server 100 according to the present exemplary embodiment.

As illustrated in FIG. 4, the information processing server 100 includes an image information acquisition unit 410, a person extraction unit 420, a person feature quantity similarity calculation unit 430, an appearance time score calculation unit 440, a database 450, a person attribute acquisition unit 460, an integrated score calculation unit 470, and a person associating unit 480.

The image information acquisition unit 410 acquires the video directly from the video camera 200 or the video captured by the video camera 200 from the storage medium. The person extraction unit 420 identifies a person image region from each frame of the video captured by the video camera 200, and calculates the feature quantity of each person image.

The person feature quantity similarity calculation unit 430 calculates the degree of similarity in the feature quantity of the person extracted by the person extraction unit 420. Generally, the person who is high in the degree of similarity in the feature quantity is considered to be highly likely to be the same person. At this time, the degree of similarity may be calculated only with regard to the person within the time window (exemplified in FIG. 3) determined based on the attribute of the person identified by the person attribute acquisition unit 460.

The appearance time score calculation unit 440 calculates the score (appearance time score) regarding an incident in which a person imaged in the video captured by a certain video camera 200 and a person imaged in the video captured later by another video camera 200 are the same person. The score to determine whether or not a person who has newly entered the frame of the video of the video camera C2 and a person P1 who has exited the frame of the video of the video camera C1 are the same person can be rephrased as the appearance time score regarding the incident in which the person P1 who has exited the frame of the video of the video camera C1 enters the frame of the video of the video camera C2, and the appearance time score can be obtained using time as a variable.

Figure 5:
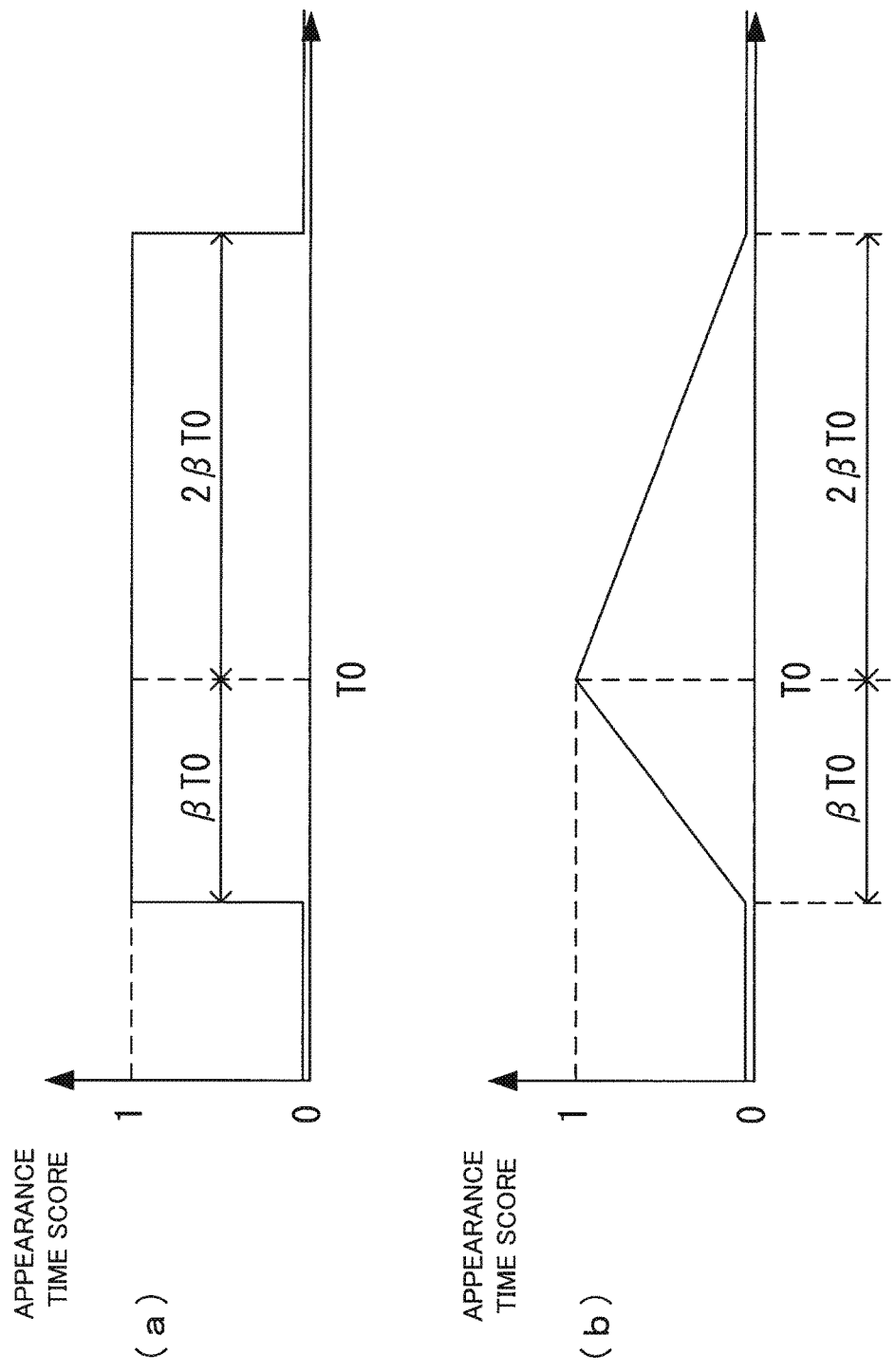
FIG. 5 is a diagram describing a concrete example of a function to calculate an appearance time score.

The function that finds the appearance time score can be expressed by using a stepwise function illustrated in (a) in FIG. 5 or a mountain-like function illustrated in (b) in FIG. 5 in the range of the time window of extracting the person candidate described in the section of <1.2.2>. When the mountain-like function as in (b) in FIG. 5 is used, the appearance time score regarding the incident where the person P1 having exited the frame of the video of the video camera C1 enters the frame of the video of the video camera C2 is highest in the vicinity of D/V1 following the time at which the person P1 has exited the frame of the video of the video camera C1, and becomes lower as it is farther away from that time.

The appearance time score calculation unit 440 refers to inter-camera information 451 stored in the DB 450 when calculating the appearance time score. The inter-camera information 451 includes information such as the distances between the video cameras 200 or the positional relations there between (from which video camera 200's capturing range to which video camera 200's capturing range it is possible to make a movement).

The person attribute acquisition unit 460 identifies the attribute of the person extracted by the person extraction unit 420. The attribute identified herein is the attribute that affects the moving speed of the person as stated above; for example, the case where the person has a gait characteristic such as roving or staggering, the case where the person is carrying a belonging such as a stick or luggage, the case where the person is a visitor visiting the place for the first time and has a line-of-sight characteristic such as restlessly looking around or repeatedly glancing at the camera, the case where the person can be assumed to be a suspicious person (for example, the person is a person registered in a black list, a moving time of the person in the past is greatly deviated from the average, or the person is avoiding other people and the like), and the like can be conceived.

Note that the gait characteristic such as roving or staggering can be determined based on the locus of the person's footing position in the video. With regard to whether or not the person is carrying a belonging such as a stick or luggage, a pre-registered human body model may be fit in a mobile body region within the image, and a region that does not match the human body model may be extracted, and so, based on the shape, color, or size of the extracted region, the positional relation thereof from parts (for example, a hand or the like) of the person, or the like, it can be estimated whether or not the person is carrying a belonging such as a stick or luggage and what that belonging is.

The line-of-sight characteristic such as restlessly looking around or repeatedly glancing at the camera can be determined based on the directions of the line of sight obtained as a result of extracting face regions and directions of a face from images by comparison with characteristics of people's faces in various facial directions which have been registered in advance, estimating the positions of the eyes in the face regions based on a face model, and determining the positions of the irises in the eyes from the tone distributions in the eye regions.

Whether or not a person is a visitor can be determined based on image characteristics: for example, when an employee card or a visitor card is needed in order to enter a capturing area concerned, an image characteristic as to whether or not the person has entered the capturing area by using a visitor card; or when a visitor needs to have a visitor card on the visitor's chest, an image characteristic as to whether such a visitor card is on the person's chest.

The integrated score calculation unit 470 calculates the score to determine whether or not a person imaged in the video of the video camera 200 and a person imaged in the video of another video camera 200 are the same person based on the degree of similarity in the person characteristic and the appearance time score calculated by the person feature quantity similarity calculation unit 430 and the appearance time score calculation unit 440. As a calculation method for this score, for example, the technique whose concrete example has been illustrated in the section of <1.2.1>, and the like can be conceived.

The person associating unit 480 performs association of a person determined as being the same person, among the people captured by the individual video cameras 200, based on the scores calculated by the integrated score calculation unit 470. At this time, whether or not a person is the same person can be determined based on, for example, whether or not the score exceeds a fixed threshold value. If it is known which ones of the people imaged in the individual video cameras 200 are the same person or people, the movement log of each person can be identified; in other words, the tracking of a person becomes possible.

<1.4. Flow of Processing>

Figure 6:
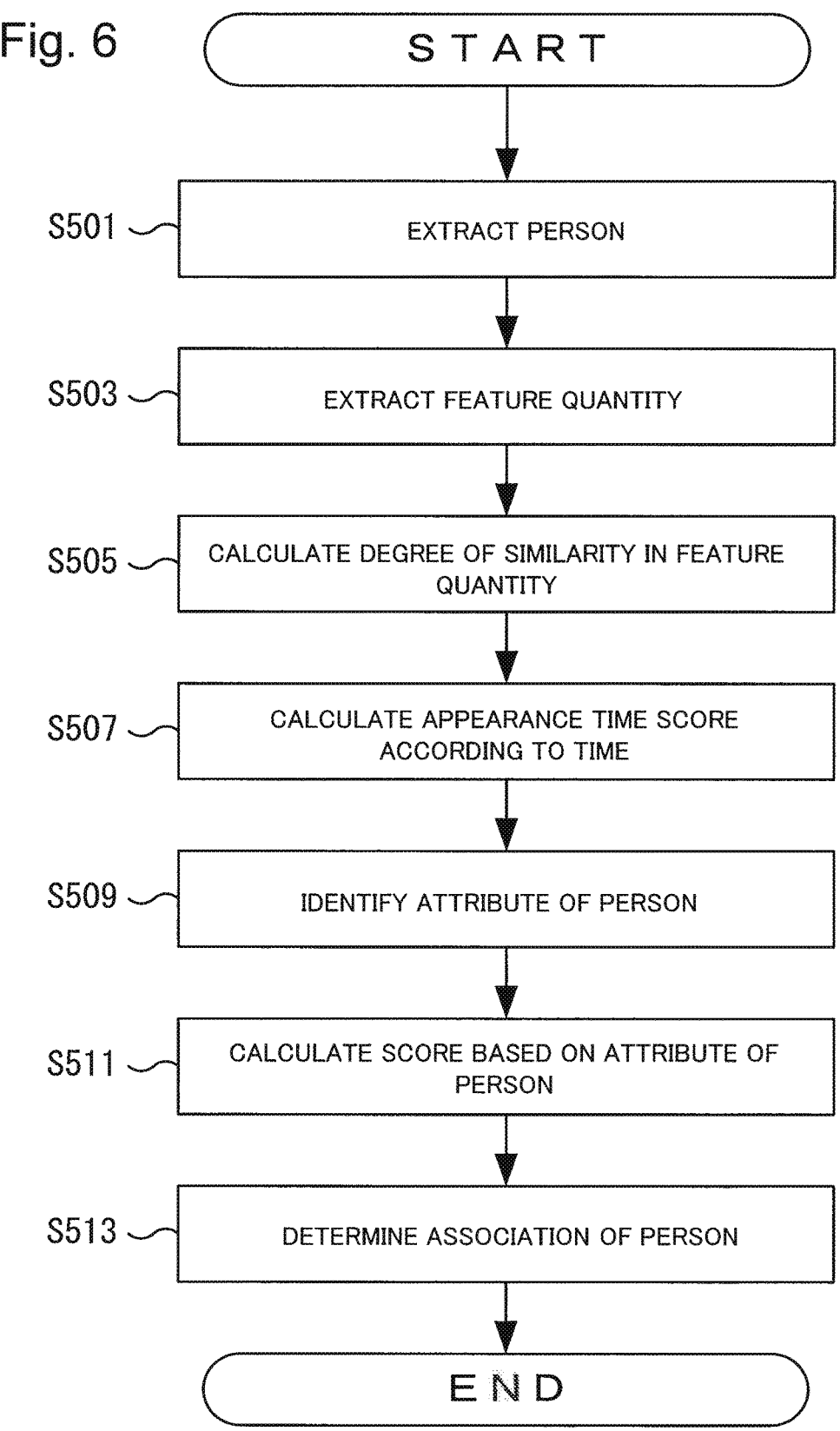
FIG. 6 is a flowchart illustrating a flow of processing of the information processing server illustrated in FIG. 1.

Hereinafter, a flow of processing of the information processing server 100 will be described with reference to FIG. 6. FIG. 6 is a flowchart illustrating a flow of processing of the information processing server 100 according to the first exemplary embodiment.

Note that, the processing steps described below can be executed in an arbitrary changed order or in parallel within a range such that no contradiction occurs in the content of processing; furthermore, another step may be added between the respective processing steps. Furthermore, a step mentioned as one single step for the sake of convenience can be executed as a plurality of divided steps, or a plurality of the steps divided for the sake of convenience can be executed as one single step.

First, the person extraction unit 420 extracts the person region from image input from the image information acquisition unit 410 (S501), and extracts the feature quantity from the extracted person region (person image) (S503). Then, the person feature quantity similarity calculation unit 430 calculates the degree of similarity between a person imaged in the video of the video camera 200 and the person imaged in the video of the video camera 200 present at a position to which the person can move from the capturing range of that video camera 200 (S505). At this time, the time window may be provided for person extraction as described above with reference to FIG. 3.

Furthermore, the appearance time score calculation unit 440 calculates the appearance time score based on a difference time between the time at which a person has exited the frame of the video of the video camera 200 and a time at which the person has entered the frame of the video of another video camera 200 (S507).

The person attribute acquisition unit 460 identifies the attribute of each person imaged in the video camera 200 (S509). Concrete examples of this identification method have been described in the section of <1.3>, and descriptions thereof are omitted herein.

The integrated score calculation unit 470 calculates the score to determine whether or not people imaged in the individual video cameras 200 are the same person based on the attribute of the person identified by the person attribute acquisition unit 460, the degree of similarity in the feature quantity calculated by the person feature quantity similarity calculation unit 430, and the appearance time score calculated by the appearance time score calculation unit 440 (S511), and the person associating unit 480 determines correspondence relationship of the people based on the score (S513).

<1.5. Hardware Configuration>

Herein, with reference to FIG. 7, an example of a hardware configuration in the case where the foregoing information processing server 100 is realized by a computer will be described. Note that, as stated above, the functions of the information processing server 100 can be realized by a plurality of information processing apparatuses as well.

Figure 7:
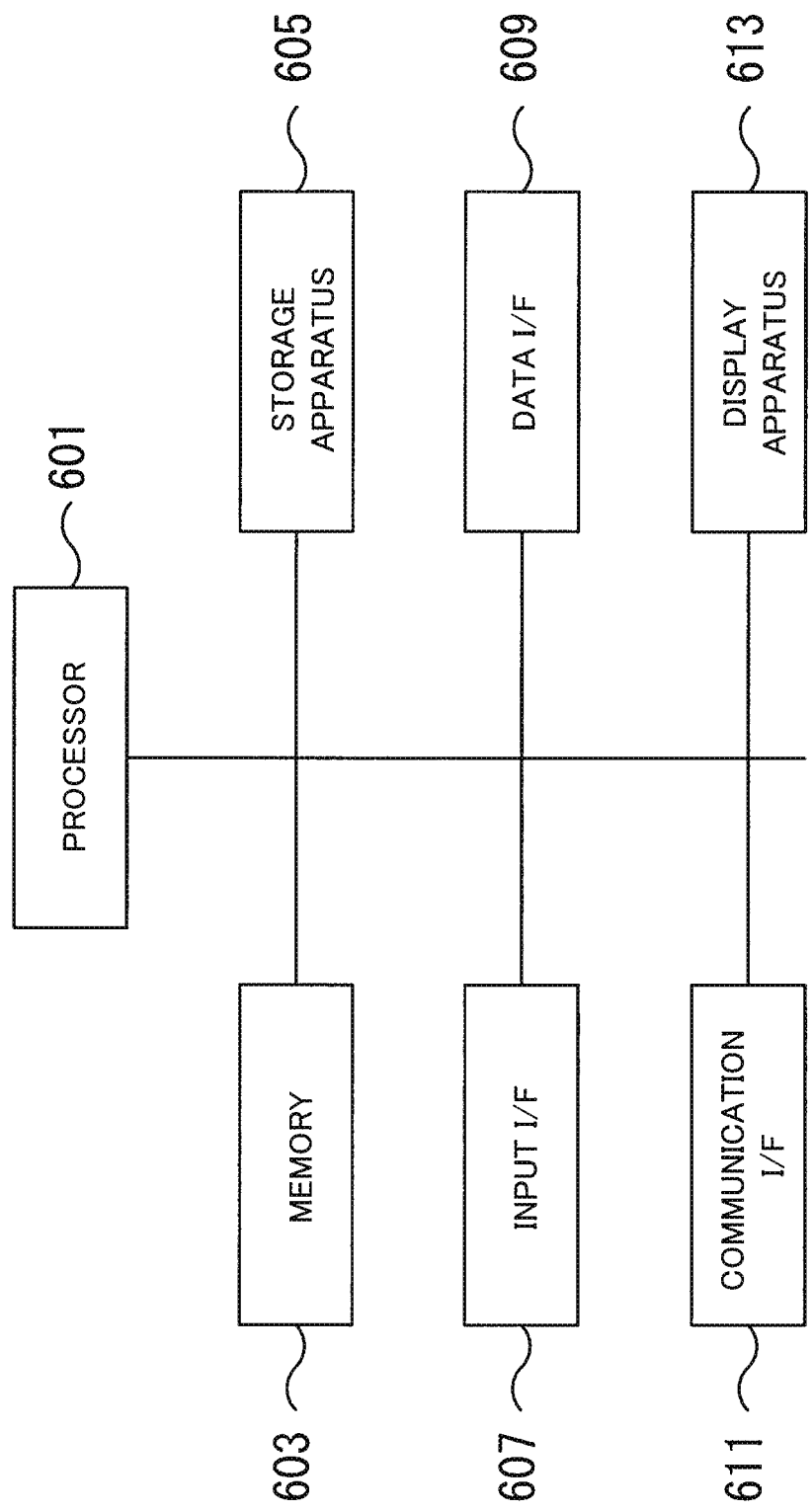
FIG. 7 is a block diagram illustrating a configuration of hardware in which the information processing server illustrated in FIG. 1 can be realized.

As illustrated in FIG. 7, the information processing server 100 includes a processor 601, a memory 603, a storage apparatus 605, an input interface (I/F) 607, a data I/F 609, a communication I/F 611, and a display apparatus 613.

The processor 601 controls various processing in the information processing server 100 by executing programs stored in the memory 603. For example, the processing related to the image information acquisition unit 410, the person extraction unit 420, the person feature quantity similarity calculation unit 430, the appearance time score calculation unit 440, the person attribute acquisition unit 460, the integrated score calculation unit 470, and the person associating unit 480 illustrated in FIG. 4 are realizable mainly as programs that run on the processor 601.

The memory 603 is, for example, a storage medium such as a RAM (Random Access Memory). The memory 603 temporarily stores program codes of programs executed by the processor 601 and data that become needed at the time of execution of a program. For example, in a storage area of the memory 603, there is secured a stack area that becomes needed at the time of execution of a program.

The storage apparatus 605 is, for example, a non-volatile storage medium such as a hard disk or a flash memory. The storage apparatus 605 stores program for an operating system, various programs for realizing the image information acquisition unit 410, the person extraction unit 420, the person feature quantity similarity calculation unit 430, the appearance time score calculation unit 440, the person attribute acquisition unit 460, the integrated score calculation unit 470, and the person associating unit 480, various data such as the inter-camera information 451 contained in the DB 450, and the like. The programs and data stored in the storage apparatus 605 are loaded on the memory 603 according to need so as to be referred to from the processor 601.

The input I/F 607 is a device to accept inputs from users. The input apparatus 400 described with FIG. 1 can also be realized by the input I/F 607. As concrete examples of the input I/F 607, a keyboard, a mouse, a touch panel, various sensors, and the like can be cited. The input I/F 607 may be connected to the information processing server 100, for example, via an interface such as a USB (Universal Serial Bus).

The data I/F 609 is a device to input data from outside the information processing server 100. As concrete examples of the data I/F 609, there are a drive apparatus to read data stored in various storage apparatuses and the like. It is also conceivable that the data I/F 609 is provided outside the information processing server 100. In that case, the data I/F 609 is connected to the information processing server 100, for example, via an interface such as an USB.

The communication I/F 611 is a device to communicate data wirelessly or via a cable between apparatuses outside the information processing server 100, for example, the video cameras 200 or the like. It is also conceivable that the communication I/F 611 is provided outside the information processing server 100. In that case, the communication I/F 611 is connected to the information processing server 100, for example, via an interface such as USB.

The display apparatus 613 is a device to display various pieces of information. The display apparatus 300 described with FIG. 1 can be realized by the display apparatus 613 as well. As concrete examples of the display apparatus 613, for example, liquid crystal displays, organic EL (Electro-Luminescence) displays, or the like can be cited. The display apparatus 613 may be provided outside the information processing server 100. In this case, the display apparatus 613 is connected to the information processing server 100, for example, via a display cable or the like.

<1.6. Advantageous Effects According to First Exemplary Embodiment>

As described above, the monitoring system 1 according to the first exemplary embodiment is configured to change the method for determining the sameness according to whether or not a person is a person having such the attribute as to affect the moving speed. Concretely, for example, regarding a person who has an attribute that is highly likely to affect the moving speed, the proportion of the sameness determination based on the appearance time score is reduced or the time window for the sameness determination is widened. Due to this, it becomes possible to suitably perform the tracking of a person.

2. Second Exemplary Embodiment

Figure 8:
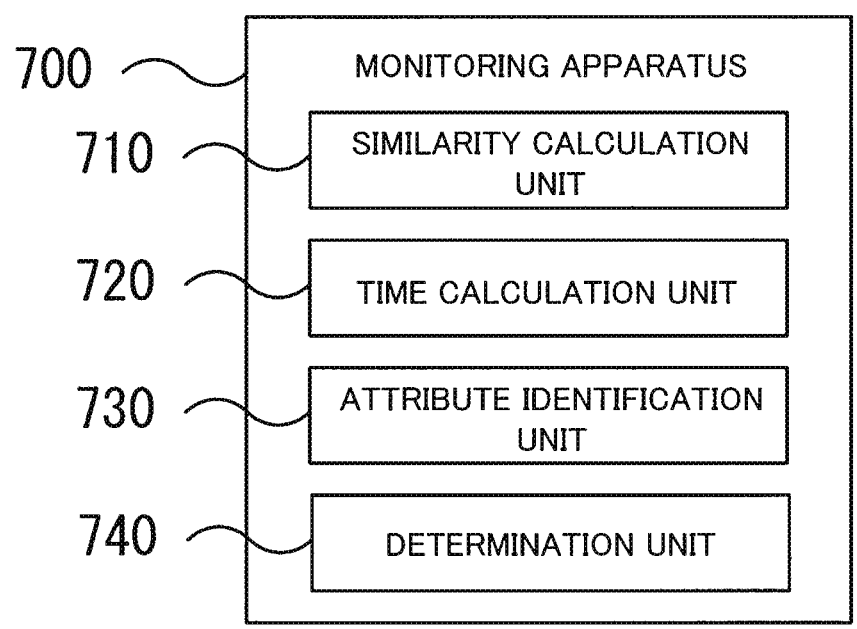
FIG. 8 is a functional block diagram illustrating a general configuration of a monitoring apparatus according to a second exemplary embodiment.

Hereinafter, a second exemplary embodiment will be described with reference to FIG. 8. FIG. 8 is a block diagram illustrating a functional configuration of a monitoring apparatus 700 that is an information processing system. As illustrated in FIG. 8, the monitoring apparatus 700 includes a similarity calculation unit 710, a time calculation unit 720, an attribute identification unit 730, and a determination unit 740.

The similarity calculation unit 710 calculates a degree of similarity between a mobile body (herein termed a first mobile body) imaged in video of a certain video camera (herein termed a first video camera) and a mobile body (herein termed a second mobile body) imaged in video of another video camera (herein termed a second video camera), of a plurality of video cameras that are not depicted. Note that, as concrete examples of mobile bodies, for example, people, motor vehicles, bicycles, motor cycles, etc., can be cited.

The time calculation unit 720 calculates a time from when the first mobile body exits a frame of the video of the first video camera to when the second mobile body enters a frame of the video of the second video camera.

The attribute identification unit 730 identifies the attribute of the first mobile body imaged in the first video camera. Note that the attribute of the mobile body is, for example, the attribute that affects the moving speed. For example, when the mobile body is a person, the case where the person has the gait characteristic such as roving or staggering, the case where the person is carrying a belonging such as a stick or luggage, the case where the person is a visitor vising the place for the first time and has the line-of-sight characteristic such as restlessly looking around or repeatedly glancing at the camera, the case where the person can be assumed to be a suspicious person (e.g., the person is a person registered in a black list, the moving time of the person in the past is greatly deviated from the average, the person is avoiding other people, and the like), and the like are conceivable.

The determination unit 740 determines whether or not the first mobile body and the second mobile body are the same mobile body based on the attribute of the first mobile body identified by the attribute identification unit 730, the degree of similarity calculated by the similarity calculation unit 710, and the time calculated by the time calculation unit 720.

Due to the packaging in this manner, the monitoring apparatus 700 according to the second exemplary embodiment is able to track suitably a person by using video of a plurality of video cameras.

3. Supplementary Noted Matters

Note that, the configurations of the exemplary embodiments set forth above may be combined, or configuration portions may be partly interchanged. Furthermore, the configuration of the present invention is not limited only to the exemplary embodiments set forth above, but various changes may be added within a scope in which the gist of the present invention is not departed from.

Note that, a portion or the whole of each exemplary embodiment set forth above can be described as in the following supplementary notes, but is not limited to the followings. Furthermore, the program related to the present invention may be a program that causes a computer to execute the operations described in the foregoing exemplary embodiments.

(Supplementary Note 1)

An information processing system includes:

a unit that calculates time from when a first mobile body exits a frame of video of a first video camera to when a second mobile body enters a frame of video of a second video camera; and a determination unit that determines whether or not the first mobile body and the second mobile body are the same mobile body based on an attribute of the first mobile body, a degree of similarity between the first mobile body and the second mobile body, and the time.

(Supplementary Note 2)

The information processing system according to Supplementary Note 1, further includes a unit that identifies the attribute of the first mobile body.

(Supplementary Note 3)

The information processing system according to Supplementary Note 1 or 2, further includes a unit that calculates the degree of similarity between the first mobile body imaged in the video of the first video camera and the second mobile body imaged in the video of the second video camera.

(Supplementary Note 4)

The information processing system according to any one of Supplementary Notes to 3, wherein influence that the time gives to a result of determination varies according to the attribute of the first mobile body.

(Supplementary Note 5)

The information processing system according to Supplementary Note 4, wherein magnitude of the influence that the degree of similarity and the time give to the result of determination varies according to the attribute of the first mobile body.

(Supplementary Note 6)

The information processing system according to any one of Supplementary Notes 1 to 3, wherein the determination unit determines whether or not the first mobile body and the second mobile body, which is associated with time within a time window set according to the attribute of that first mobile body, are the same mobile body based on the degree of similarity between the those mobile bodies.

(Supplementary Note 7)

The information processing system according to Supplementary Note 6, wherein the time window is set based on an average time of mobile body moving from a capturing range of the first video camera to a capturing range of the second video camera, and time between an upper limit time of the time window and the average time of movement is longer than time between a lower limit time of the time window and the average time of movement.

(Supplementary Note 8)

The information processing system according to any one of Supplementary Notes 1 to 7, wherein the attribute has correlation with the moving speed of the mobile body.

(Supplementary Note 9)

An information processing method in which an information processing system performs:

calculating time from when a first mobile body exits a frame of video of a first video camera to when a second mobile body enters a frame of video of a second video camera; and determining whether or not the first mobile body and the second mobile body are the same mobile body based on an attribute of the first mobile body, a degree of similarity between the first mobile body and the second mobile body, and the time.

(Supplementary Note 10)

The information processing method according to Supplementary Note 9, further includes identifying the attribute of the first mobile body.

(Supplementary Note 11)

The information processing method according to Supplementary Note 9 or 10, further includes calculating the degree of similarity between the first mobile body imaged in the video of the first video camera and the second mobile body imaged in the video of the second video camera.

(Supplementary Note 12)

The information processing method according to any one of Supplementary Notes 9 to 11, wherein influence that the time gives to a result of determination varies according to the attribute of the first mobile body.

(Supplementary Note 13)

The information processing method according to Supplementary Note 12, wherein magnitude of the influence that the degree of similarity and the time give to the result of determination varies according to the attribute of the first mobile body.

(Supplementary Note 14)

The information processing method according to any one of Supplementary Notes 9 to 11, wherein, determining whether or not the first mobile body and the second mobile body, which is associated with time within a time window set according to the attribute of that first mobile body, are the same mobile body based on the degree of similarity between the those mobile bodies.

(Supplementary Note 15)

The information processing method according to Supplementary Note 14, wherein the time window is set based on an average time of mobile body moving from a capturing range of the first video camera to a capturing range of the second video camera, and time between an upper limit time of the time window and the average time of movement is longer than time between a lower limit time of the time window and the average time of movement.

(Supplementary Note 16)

The information processing method according to any one of Supplementary Notes 9 to 15, wherein the attribute has correlation with the moving speed of the mobile body.

(Supplementary Note 17)

A program that causes a computer to execute:

processing of calculating time from when a first mobile body exits a frame of video of a first video camera to when a second mobile body enters a frame of video of a second video camera; and processing of determining whether or not the first mobile body and the second mobile body are the same mobile body based on an attribute of the first mobile body, a degree of similarity between the first mobile body and the second mobile body, and the time.

(Supplementary Note 18)

The program according to Supplementary Note 17, the program further causes a computer to execute processing of identifying the attribute of the first mobile body.

(Supplementary Note 19)

The program according to Supplementary Note 17 or 18, the program further causes a computer to execute processing of calculating the degree of similarity between the first mobile body imaged in the video of the first video camera and the second mobile body imaged in the video of the second video camera.

(Supplementary Note 20)

The program according to any one of Supplementary Notes 17 to 19, wherein influence that the time gives to a result of determination varies according to the attribute of the first mobile body.

(Supplementary Note 21)

The program according to Supplementary Note 20, wherein magnitude of the influence that the degree of similarity and the time give to the result of determination varies according to the attribute of the first mobile body.

(Supplementary Note 22)

The program according to any one of Supplementary Notes 17 to 19, wherein the determination unit determines whether or not the first mobile body and the second mobile body, which is associated with time within a time window set according to the attribute of that first mobile body, are the same mobile body based on the degree of similarity between the those mobile bodies.

(Supplementary Note 23)

The program according to Supplementary Note 22, wherein the time window is set based on an average time of mobile body moving from a capturing range of the first video camera to a capturing range of the second video camera, and time between an upper limit time of the time window and the average time of movement is longer than time between a lower limit time of the time window and the average time of movement.

(Supplementary Note 24)

The program according to any one of Supplementary Notes 17 to 23, wherein the attribute has correlation with the moving speed of the mobile body.

This application is based upon and claims the benefit of priority from Japanese patent application No. 2013-27796, filed on Feb. 15, 2013, the disclosure of which is incorporated herein in its entirety by reference.

REFERENCE SIGNS LIST

1 Monitoring system
20, 100 Information processing server
200 Video camera
300 Display apparatus
400 Input apparatus
410 Image information acquisition unit
420 Person extraction unit
430 Person feature quantity similarity calculation unit
440 Appearance time score calculation unit
450 Database
451 Inter-camera information
460 Person attribute acquisition unit
470 Integrated score calculation unit
480 Person associating unit
601 Processor
603 Memory
605 Storage apparatus
607 Input interface
609 Data interface
611 Communication interface
613 Display apparatus
700 Monitoring apparatus
710 Similarity calculation unit
720 Time calculation unit
730 Attribute identification unit
740 Determination unit

What is claimed is:

1. An information processing system comprising:
at least one processor configured to execute:
a unit that calculates time from when a first mobile body exits a frame of video of a first video camera to when a second mobile body enters a frame of video of a second video camera; and
a determination unit that determines whether or not the first mobile body and the second mobile body are the same mobile body based on an attribute of the first mobile body, a similarity between the first mobile body and the second mobile body, and the time, wherein the time is weighted according to the attribute of the first mobile body, the attribute being based on an action characteristic of the first mobile body, and the similarity being determined based on a result of a comparison between a first feature quantity extracted from an image of the first mobile body and a second feature quantity extracted from an image of the second mobile body.

2. The information processing system according to claim 1, further comprising
a unit that identifies the attribute of the first mobile body.

3. The information processing system according to claim 1, further comprising
a unit that calculates the similarity between the first mobile body imaged in the frame of video of the first video camera and the second mobile body imaged in the frame of video of the second video camera.

4. The information processing system according to claim 1, wherein influence that the time gives to a result of determination varies according to the attribute of the first mobile body.

5. The information processing system according to claim 1, wherein information on the time and the similarity utilized by the determination unit are information on time and similarity weighed respectively according to attribute of the first mobile body.

6. The information processing system according to claim 1, wherein the determination unit determines whether or not the first mobile body and the second mobile body, which is associated with time within a time window set according to the attribute of that first mobile body, are the same mobile body based on the similarity between the those mobile bodies.

7. The information processing system according to claim 6, wherein the time window is set based on an average time of mobile body moving from a capturing range of the first video camera to a capturing range of the second video camera, and
time between an upper limit time of the time window and the average time of movement is longer than time between a lower limit time of the time window and the average time of movement.

8. The information processing system according to claim 1, wherein the attribute has correlation with the moving speed of the first mobile body.

9. An information processing method in which an information processing system performs:
calculating, by at least one processor, a time from when a first mobile body exits a frame of video of a first video camera to when a second mobile body enters a frame of video of a second video camera; and
determining, by the at least one processor, whether or not the first mobile body and the second mobile body are the same mobile body based on an attribute of the first mobile body, a similarity between the first mobile body and the second mobile body, and the time, wherein the time is weighted according to the attribute of the first mobile body, the attribute being based on an action characteristic of the first mobile body, and the similarity being determined based on a result of a comparison between a first feature quantity extracted from an image of the first mobile body and a second feature quantity extracted from an image of the second mobile body.

10. A non-transitory computer-readable recording medium recorded with a program that causes a computer to execute:
processing of calculating, by at least one processor, time from when a first mobile body exits a frame of video of a first video camera to when a second mobile body enters a frame of video of a second video camera; and
processing of determining, by the at least one processor, whether or not the first mobile body and the second mobile body are the same mobile body based on an attribute of the first mobile body, a similarity between the first mobile body and the second mobile body, and the time, wherein the time is weighted according to the attribute of the first mobile body, the attribute being based on an action characteristic of the first mobile body, and the similarity being determined based on a result of a comparison between a first feature quantity extracted from an image of the first mobile body and a second feature quantity extracted from an image of the second mobile body.

11. An information processing system comprising:
at least one processor configured to execute:
means for calculating a time from when a first mobile body exits a frame of video of a first video camera to when a second mobile body enters a frame of video of a second video camera; and determination means for determining whether or not the first mobile body and the second mobile body are the same mobile body based on an attribute of the first mobile body, a similarity between the first mobile body and the second mobile body, and the time, wherein the time is weighted according to the attribute of the first mobile body, the attribute being based on an action characteristic of the first mobile body, and the similarity being determined based on a result of a comparison between a first feature quantity extracted from an image of the first mobile body and a second feature quantity extracted from an image of the second mobile body.

12. The information processing system of claim 1, wherein the similarity is a similarity between the feature quantity calculated for the first mobile object and the feature quantity calculated for the second mobile object.

* * * * *